United States Patent
Simon et al.

(10) Patent No.: US 6,422,493 B1
(45) Date of Patent: Jul. 23, 2002

(54) METHOD AND APPARATUS FOR SORTING RECYCLABLE PRODUCTS

(75) Inventors: Jonathan L. Simon; James R. Clark, both of Temple, PA (US)

(73) Assignee: Simon Family Partners, Reading, PA (US)

( * ) Notice: Subject to any disclaimer, the term of this patent is extended or adjusted under 35 U.S.C. 154(b) by 0 days.

(21) Appl. No.: 09/585,176

(22) Filed: Jun. 1, 2000

(51) Int. Cl.$^7$ ................................................ B02C 23/00
(52) U.S. Cl. ...................... 241/24.14; 241/24.1; 241/68; 209/12.1; 209/212; 209/241
(58) Field of Search ........................... 241/19, 24.1, 73, 241/89.1, 68, 17, 24.14; 209/12.1, 30, 38, 212, 241

(56) References Cited

U.S. PATENT DOCUMENTS

| | | |
|---|---|---|
| 4,139,454 A | 2/1979 | Larson |
| 4,387,019 A * | 6/1983 | Dale et al. .................. 209/12.1 |
| 4,874,134 A * | 10/1989 | Wiens .................... 241/24.1 X |
| 5,134,944 A | 8/1992 | Keller et al. |
| 5,301,881 A | 4/1994 | Hayashi et al. |
| 5,443,157 A | 8/1995 | Baker et al. |
| 5,465,847 A | 11/1995 | Gilmore |
| 5,503,788 A | 4/1996 | Lazareck et al. |
| 5,655,664 A | 8/1997 | Barret |
| 5,695,130 A * | 12/1997 | Csendes ....................... 241/19 |
| 5,855,664 A | 1/1999 | Bielecki et al. |
| 6,024,226 A | 2/2000 | Olivier |

\* cited by examiner

Primary Examiner—W Donald Bray
(74) Attorney, Agent, or Firm—Volpe and Koenig, P.C.

(57) ABSTRACT

A method for recovering a fuel substance by separating materials in a salvage operation based on BTU content is provided. A non-sorted material stream including metallic and non-metallic components, which preferably includes automobile scrap, is fed to a shredder which shreds or fragments the materials. After shredding, the non-sorted material stream is separated by a series of separators. The non-sorted material stream is first conveyed to a gravity separator where the materials are separated into two streams, namely, a heavy material stream and a light material stream. The heavy material stream is then conveyed to a magnetic separator where ferrous metals are separated from a number of non-ferrous materials. The heavy ferrous metals are collected for recycling whereas the heavy non-ferrous materials are conveyed to a screen and further separated into non-ferrous metal and non-metallic material. The light material stream is passed under a cross belt magnetic separator where the light ferrous metals are separated out. The remaining light material stream is then conveyed to a rotary trommel which separates the light material stream into two fractions based on size. The fine material separated by the trommel has been relatively inert during processing. The coarse material from the trommel is further separated to remove non-ferrous metal material. The remaining coarse material has a high BTU content, and can be utilized as fuel substance.

11 Claims, 2 Drawing Sheets

METHOD AND APPARATUS FOR SORTING RECYCLABLE PRODUCTS

BACKGROUND

The present invention relates to solid waste material sorting and recycling systems. More particularly, the present invention relates to a method of producing a reusable fuel substance by separating materials in a salvage operation which receives mixed materials, such as automobiles.

Since millions of automobiles become old or unusable, automobile disposal creates an enormous problem. The scrap metal industry has attempted to alleviate this problem by designing several types of mechanized recycling systems.

At these recycling centers, complete automobile bodies (including the seats and upholstery) as well as other types of metallic (containing various amounts of contamination and non-metallic components) are shredded into smaller pieces. The goal is to separate the metallics from the non-metallic components. While the metallics are typically recycled, the non-metallic materials have traditionally been taken to a dump for disposal. This has primarily been due to industry's inability to find an effective, cost-effective alternative.

In an effort to extend the life of existing landfill facilities and as space in them becomes more limited, there is renewed interest in exploring new alternatives. This is heightened by the trend in automobile design toward fewer and fewer metallic components and an increasing the number of non-metallic components. Therefore, it is necessary to develop systems for sorting and recycling as many reusable automobile components as possible. Specifically, there remains a need for improved methods whereby non-metallic materials are converted into reusable byproducts.

SUMMARY

The present invention provides a method for recovering a fuel substance by separating materials in a recycling operation based on BTU content.

In the present method, a non-sorted material stream including metallic and non-metallic components, which may include automobile scrap, is fed to a shredder which fragments the materials. After shredding, the non-sorted material stream is separated by a series of separators.

The non-sorted material stream is first conveyed to a gravity separator where the materials are separated into two streams, namely, a heavy material stream and a light material stream. The heavy material stream is then conveyed to a magnetic separator where ferrous metals are separated from a number of non-ferrous materials. The heavy ferrous metals are collected for recycling whereas the heavy non-ferrous materials are conveyed to a trommel screen and further separated into non-ferrous metal and non-metallic material. Both products are subsequently recycled after sizing.

The light material stream is passed under a cross belt magnetic separator where the light ferrous metals are separated out. The remaining light material stream is then conveyed to a rotary trommel which separates the light material stream into two fractions based on size. The fine material separated by the trommel has been rendered relatively inert. The larger material from the trommel is further separated to remove non-ferrous metal material. The remaining coarse material has a high BTU content, and can be utilized as fuel substance.

DETAILED DESCRIPTION OF THE PREFERRED EMBODIMENT

Figure 1:
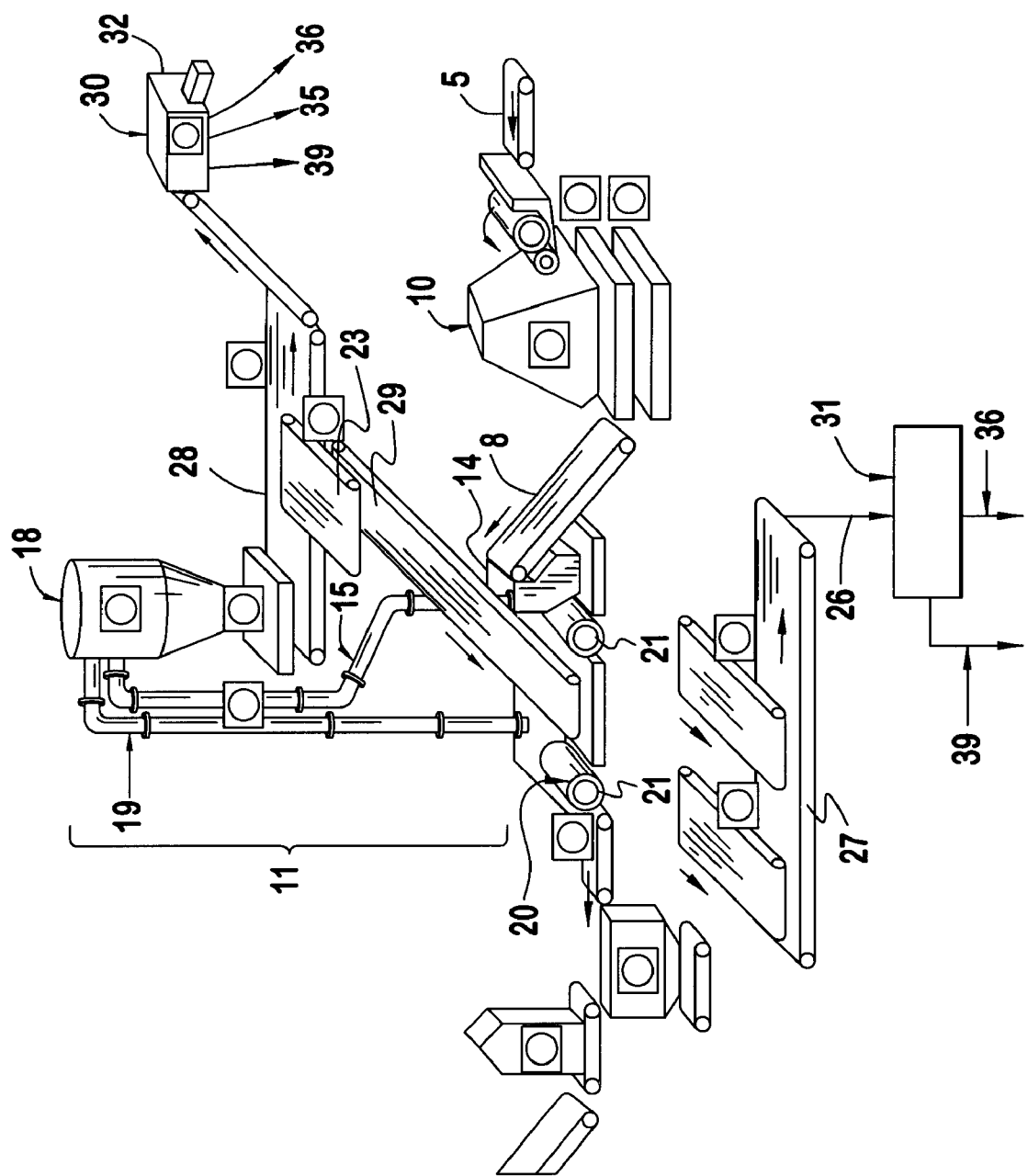
FIG. 1 is a prescriptive view of the separation and recycling system embodying the method of the present invention.

The present invention will be described with reference to the drawing Figures where like numerals represent like elements throughout.

Figure 2:
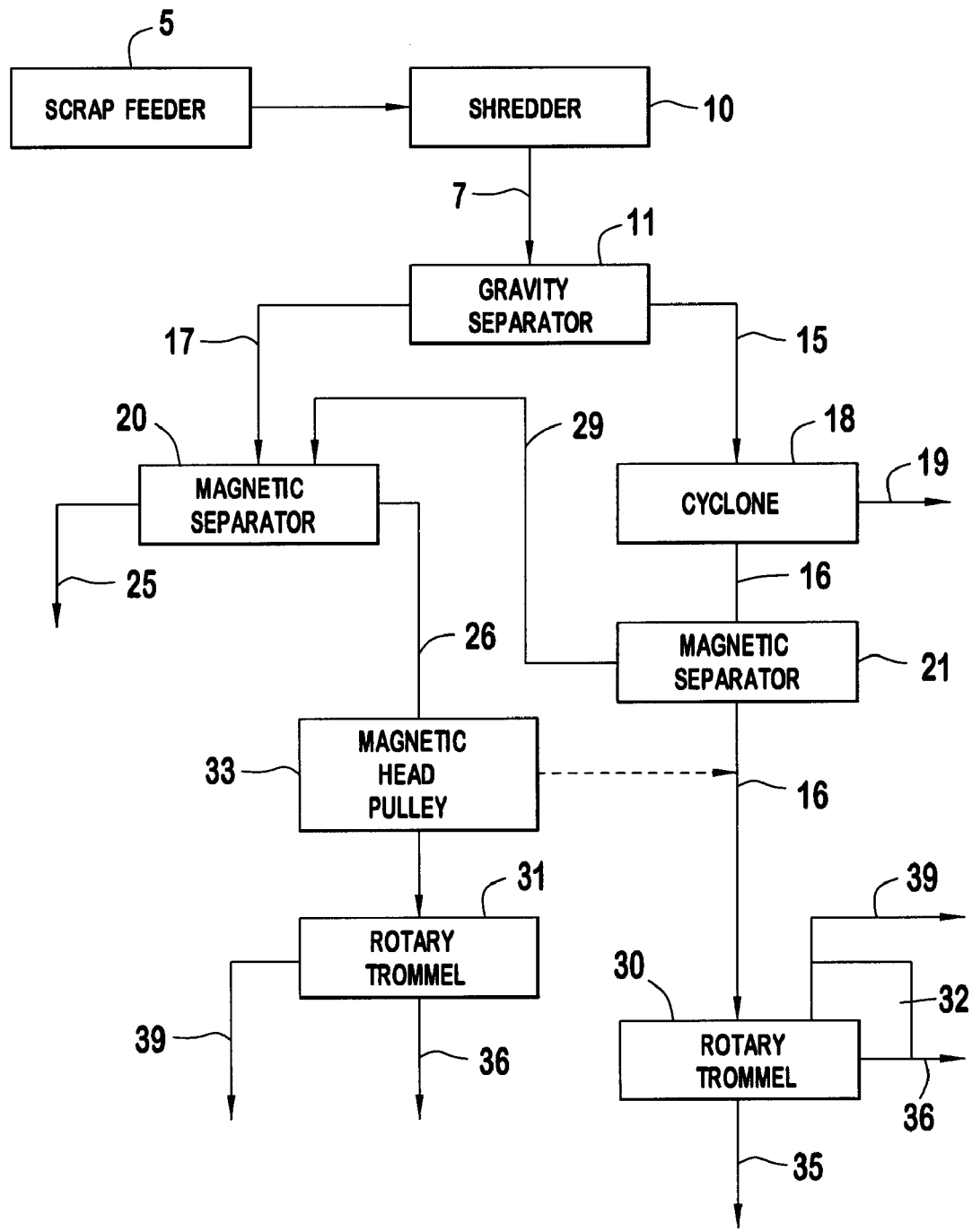
FIG. 2 is a schematic flow diagram of the separation and recycling system embodying the method of the present invention.

Referring to FIGS. 1 and 2, a separation and recycling system used in accordance with the present invention is shown. In the preferred method of the present invention, a scrap feeder 5 delivers a non-sorted (heterogeneous) material stream of recycled material, such as automobiles, office furniture, appliances, industrial equipment, etc. (all of which may contain plastic and/or fabric) to a shredder 10 where they are shredded or fragmented. The shredder 10 is preferably a rotary hammer mill. However, it will be recognized by those skilled in the art that other types or configurations of shredding equipment may be utilized, if desired. Preferably, a surfactant is added to the material stream during shredding.

The shredded materials 7 are then carried by a conveyor 8 to a gravity separator 11. The gravity separator 11 preferably includes an intake tube 15, a cyclone air separator 18 and a clean air exhaust tube 19. The intake tube 15 has a first end that is connected to the intake side of the cyclone air separator 18 and a second end located connected to a collection housing 14 where the shredded materials 7 are transported by the conveyor 8. The vacuum air flow generated by the cyclone separator 18 is directed to the shredded material 7 via the intake tube 15. Due to the lower specific gravities of the light materials, such as upholstery, plastics, fabric, they are drawn into the intake tube 15, along with smaller particles of other materials. Heavier materials, such as pieces of metal, pass through the gravity separator 11. Return air is fed via the exhaust tube 19 back from the cyclone separator 18 to the housing 10. The intake tube draws approximately 40,000 to 50,000 cubic feet per minute of air to create a vacuum pressure. While the preferred system utilizes gravity separation based on a vacuum force to remove the lighter material portion of the shredded materials 7, other means could be utilized, if desired.

The heavy materials, including both ferrous and non-ferrous, are conveyed to a magnetic separator 20 which comprises one or more magnetic rollers 21. As the heavy materials pass through the magnetic separator 20, ferrous metals 25 which are attracted to the magnetic rollers 21, cling to the rollers and are carried through the magnetic separator 20 to a ferrous metal discharge stream 25. While a magnetic drum separator is preferred, those skilled in the art will recognize that other types of magnetic separators can be utilized, if desired. The ferrous metals 25 that are separated are preferably sold for recycling.

The heavy non-magnetic materials 26 fall from the magnetic separator 20 onto one or more conveyors 27 and are carried away for further processing. As shown in FIG. 2, additional ferrous material fines may be removed from the non-magnetic materials 26 via a magnetic head pulley 33 located on the conveyor. These magnetic fines are preferably added to the light material stream 16, as shown. Preferably, these heavy non-magnetic materials 26 are moved to a rotary trommel 31 for further separation by screening. The trommel 31 further separates the non-magnetic materials 26 into a component consisting mainly of non-ferrous metals 36 and a component of fine, non-metallic materials 39. In the preferred embodiment, the trommel 31 has a screen mesh with ⅜ an inch openings. Based upon the previous sorting, the fine materials 39 which pass though the screen of the trommel 31 are rendered generally inert due to the surfactant added during shredding, and can be used as an alternate daily or periodic cover for landfills. The remaining component, consisting of mainly non-ferrous metals 36 is preferably sold for re-use.

The light materials drawn into the vacuum air stream of the intake tube 15 are drawn into the cyclone air separator 18. The cyclone air separator 18 separates the light materials from the air and delivers the air back to the collection housing 14 through the clean air exhaust tube 19. The light material stream 16, which can include glass, cloth, rubber, foam rubber, dirt, tar, plastics, as well as some ferrous and non-ferrous metals, is carried via a conveyor 28 past a cross belt magnetic separator 23 which separates the magnetic materials in the light material stream. The magnetic materials in the light material stream are returned to the magnetic separator 20 via a return conveyor 29. Alternatively, the magnetic materials could be conveyed directly to the ferrous metal stream 25 that exits the magnetic separator 20.

The remaining light material stream is then conveyed to a rotary trommel 30 for further separation. The rotary trommel 30 preferably includes a ⅜ inch screen and separates the remaining light material stream into a fine material 39, which includes non-ferrous as well as some ferrous fines, and the coarse material. These fines 39 tend to agglomerate due to the surfactant added during shredding become generally inert. The fine material 39 from the trommel 30 can also be used as an alternate daily or periodic cover for landfills.

The remaining coarse material is further separated utilizing an eddy current separator 32 of the type well known in the art, such as a ERIEZ eddy current separator, to remove non-ferrous metal material 36. However, those skilled in the art will recognize from the present disclosure that eddy current separators from other manufacturers may be utilized. The nonferrous metal materials 36 are preferably sold for recycling.

The remaining coarse material 35 has been found to have a BTU content which is high enough to be used as a fuel or fuel additive. Testing has shown that this remaining coarse material 35 from the shredded stream of material 7 has a BTU content of 4000 BTU/ton or more, depending on the input stream. In two separate tests, the coarse fuel material had a BTU content of over 6000 BTU/ton, and is preferably in the range of 5000–7000 BTU/ton. This coarse fuel material 35 can be further crushed, ground or shredded, and additional fines removed, if desired. This allows the now reduced fuel material 35 to be used as a blown-in fuel component. The coarse fuel material 35 may also be utilized as an additive for bituminous coal fired ovens in order to increase the BTU content for certain applications, or may be used directly as a fuel. The fuel material 35 may also be pelletized, if desired.

The present invention allows the entire stream of shredded material from the recycler to be recycled either for re-use in the case of the ferrous and non-ferrous metals, for use as landfill cover material, or for use as a fuel or fuel additive. This generates additional revenue for the salvage operator, and eliminates the costs previously associated with having to landfill a portion of the shredded waste stream 7.

While the preferred embodiment is used in connection with auto salvage as well as mixed material waste streams which include a mix of metals and plastics, such as metal and plastic furniture, appliances, and/or office equipment, it can be used in conjunction with various other types of manufacturing waste streams which include a mix of metal and plastic materials.

While the preferred embodiment of the invention have been described in detail, the invention is not limited to the specific embodiment described above, which should be considered as merely exemplary. Further modifications and extensions of the present invention may be developed, and all such modifications are deemed to be within the scope of the present invention as defined by the appended claims.

What is claimed:

1. A method of producing a fuel substance by separating materials in a recycling operation based on BTU component content comprising;

shredding a stream of materials comprising non-sorted, heterogeneous recycled materials, separating the stream of materials into heavy materials and light materials with a separator, the separator discharging the light materials in a light material stream and the heavy materials in a heavy material stream, magnetically separating ferrous and non-ferrous material from the heavy material stream, discharging the non-ferrous materials to a screen for further separation, processing the light materials through a rotary trommel and a non-ferrous metal separator to separate the light materials into fine materials, coarse materials and non-ferrous metal materials, the coarse material having a BTU component content of at least four thousand BTU's per ton.

2. The method of claim 1 wherein said stream of materials comprises non-sorted, recycled materials including a mixture of metal, plastic, and fiber.

3. The method of claim 1 further comprising separating the light materials from the heavier materials utilizing a vacuum to draw light materials from the stream of materials.

4. The method of claim 3 wherein the light and heavy materials are separated by specific gravity.

5. The method of claim 3 further comprising separating the light materials from a return air stream by cyclone air separation.

6. The method of claim 1 further comprising separating the non-ferrous materials derived from said heavy material stream into non-ferrous metallic and non-metallic materials.

7. The method of claim 1 further comprising crushing and screening the coarse material to remove fines prior to utilizing the coarse material as a fuel.

8. The method of claim 1 wherein the coarse material is greater than three eighths of an inch in size.

9. The method of claim 1 further comprising using the fine material as an alternative daily cover for landfills.

10. The method of claim 1 wherein said non-ferrous metals are recycled.

11. The method of claim 1 where the non-sorted, heterogeneous recycled materials include at least one of automobiles, appliances, office furniture, and industrial equipment.

* * * * *